INVENTORS:
Alfred Hofmann & Victor Anderson
BY
Morrison, Kennedy & Campbell
ATTORNEYS.

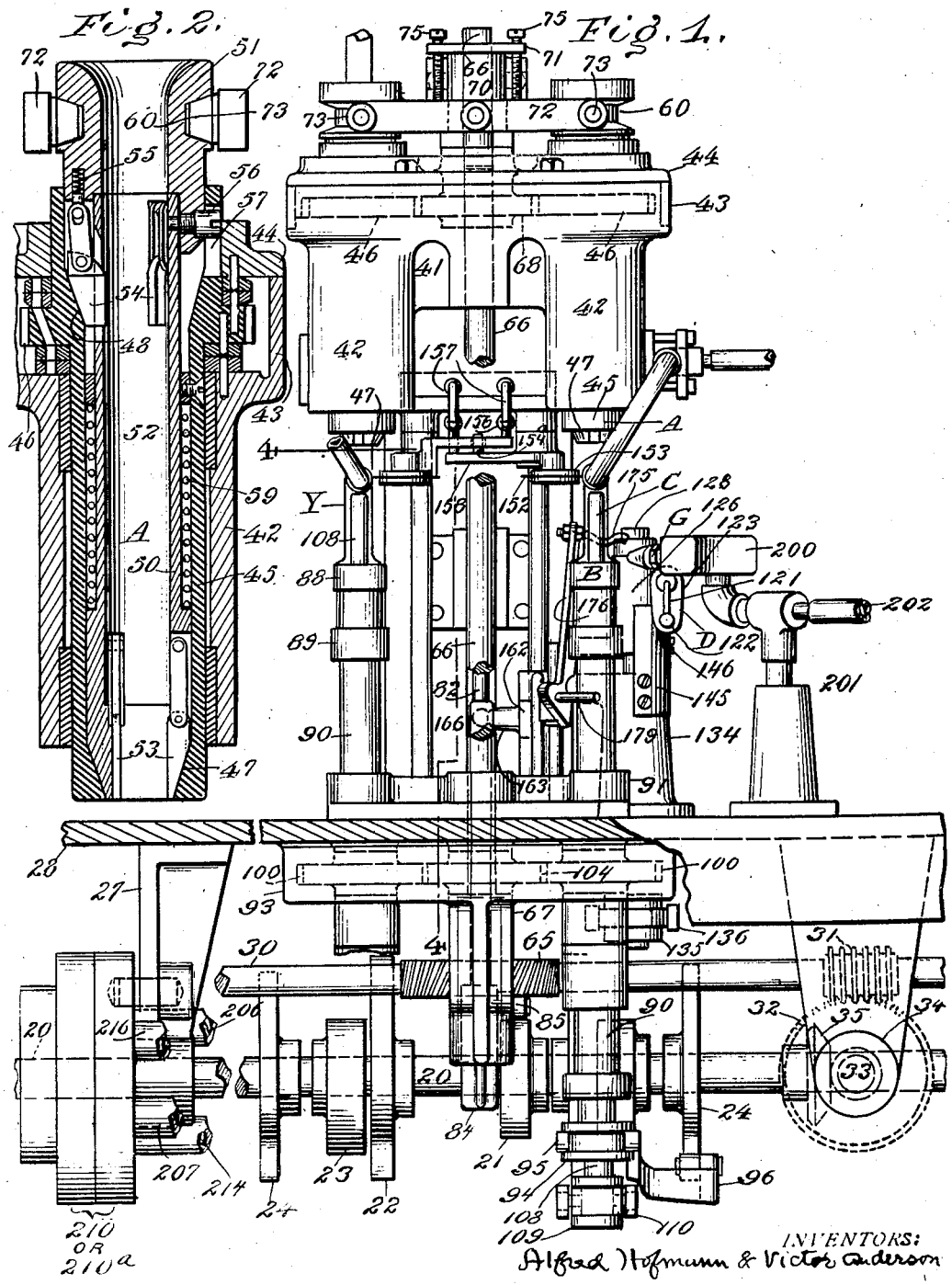

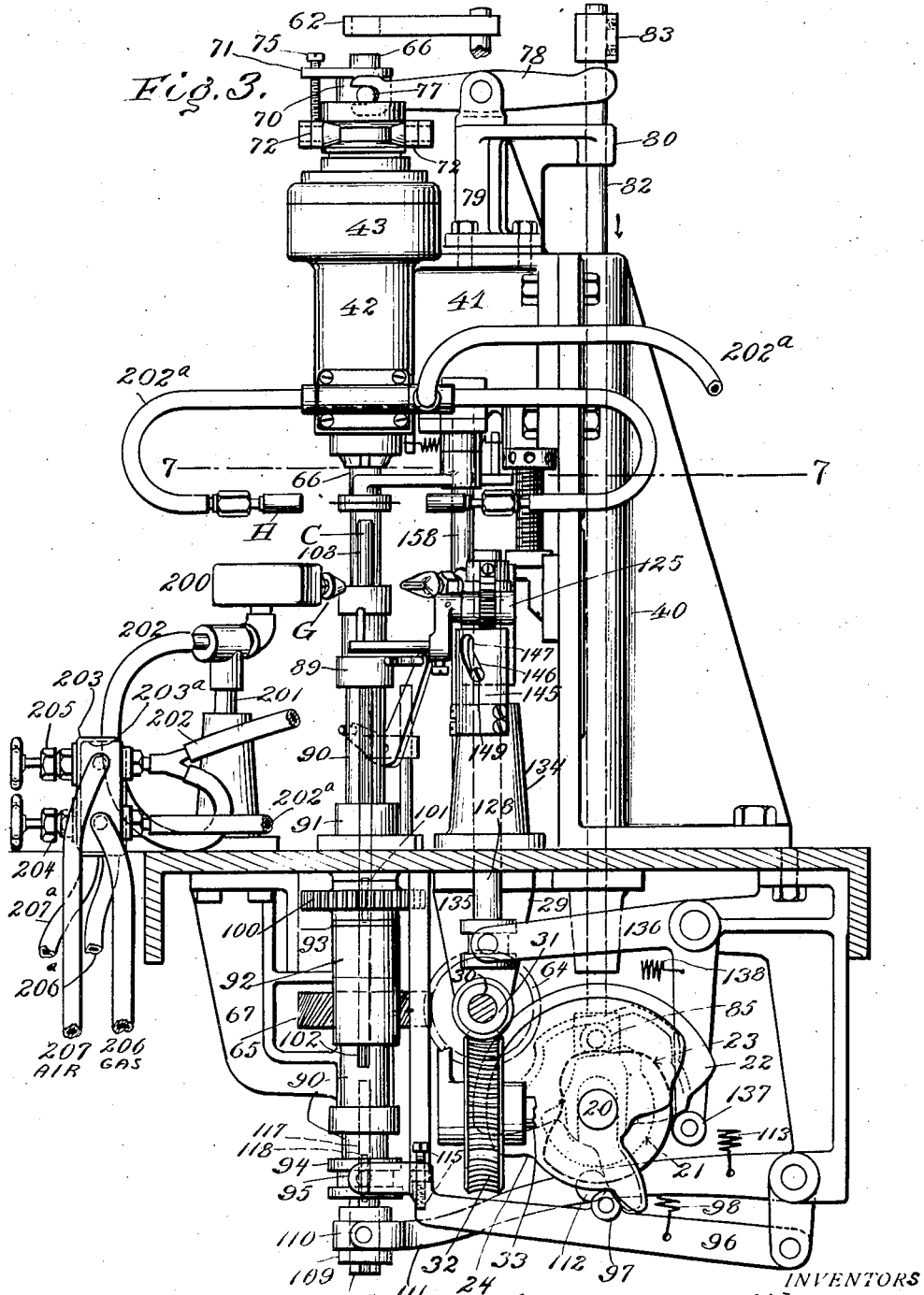

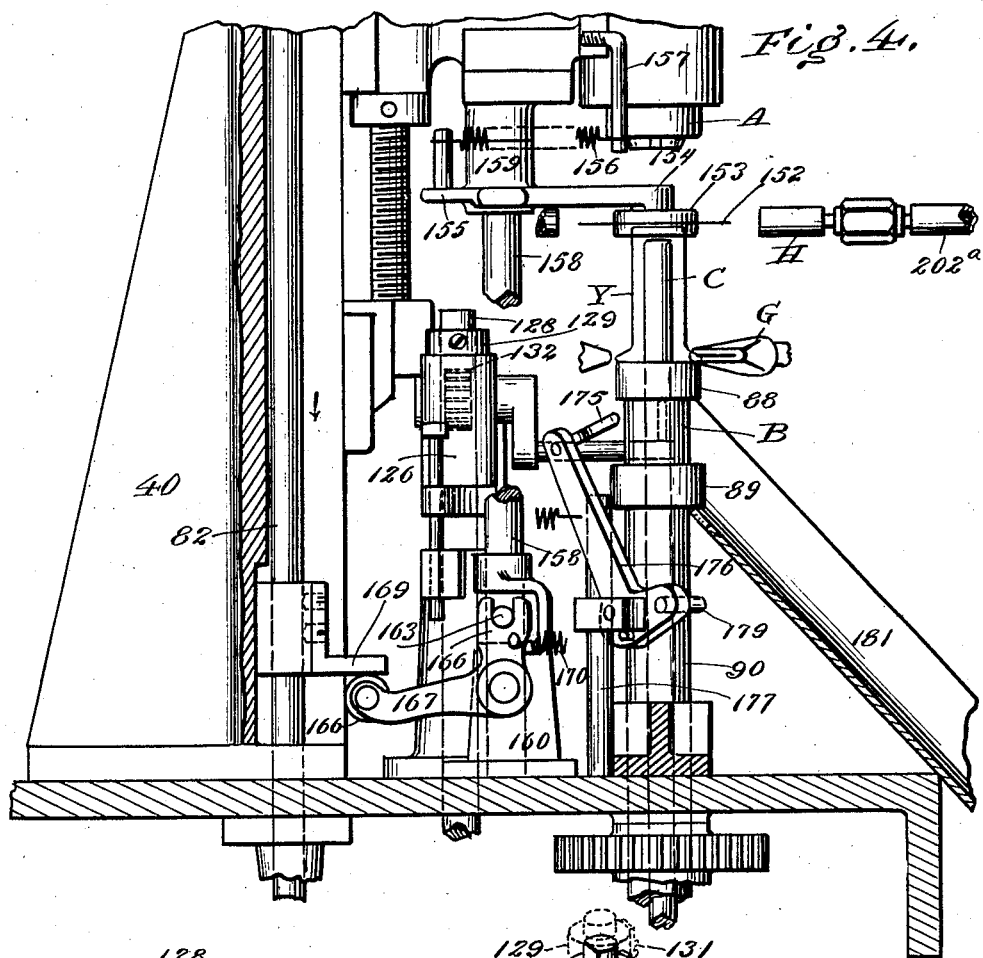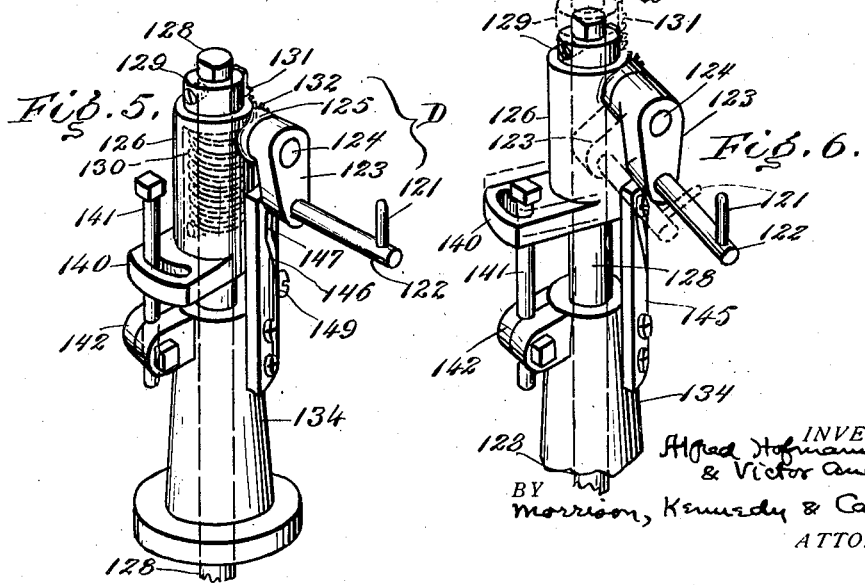

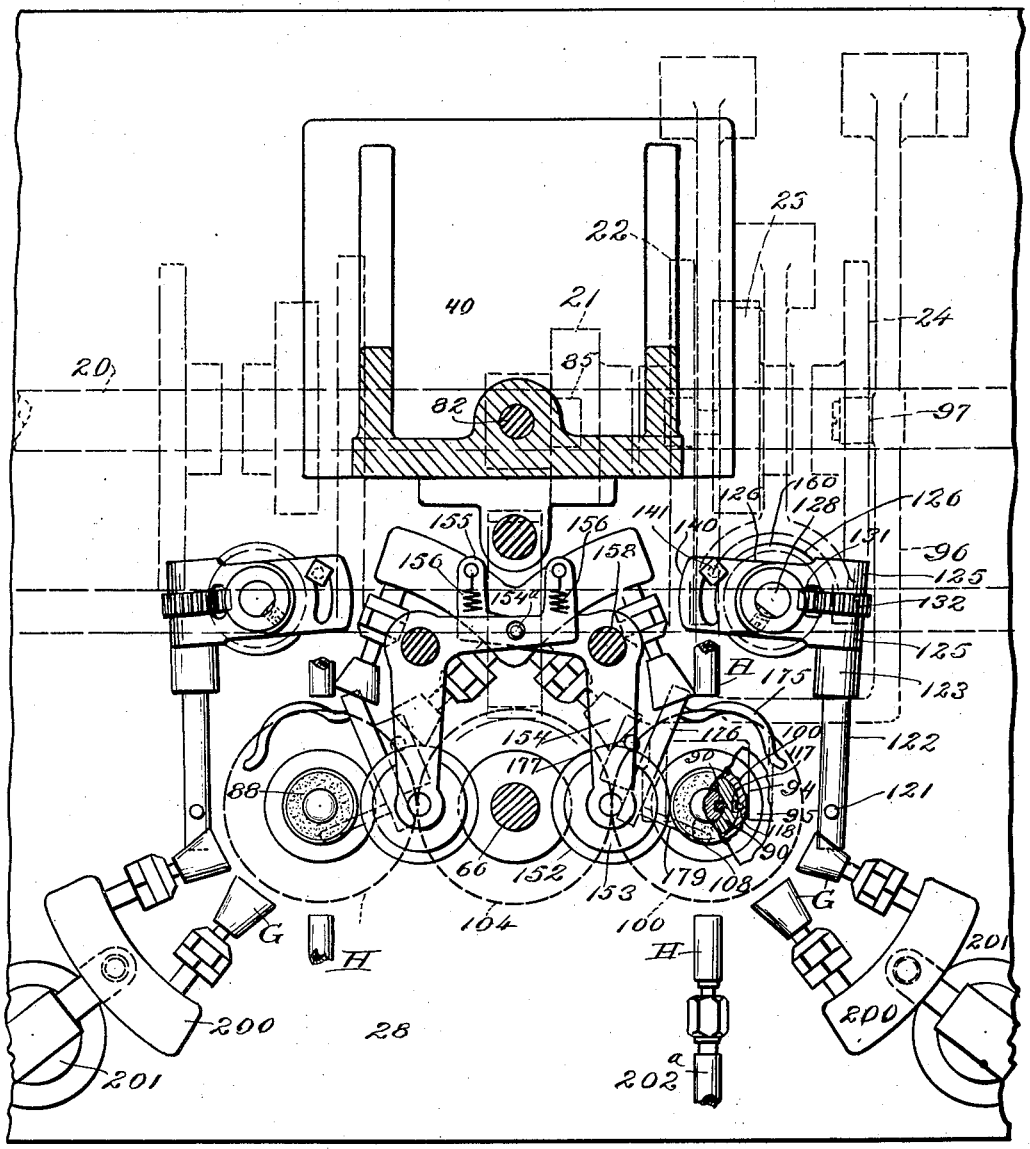

Sept. 18, 1934.  A. HOFMANN ET AL  1,974,399
MANUFACTURE OF TUBULAR GLASS ARTICLES
Filed May 12, 1932  7 Sheets-Sheet 6
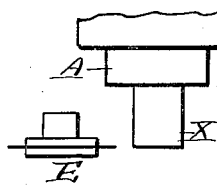
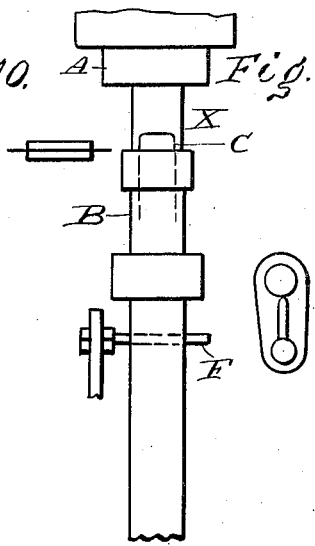
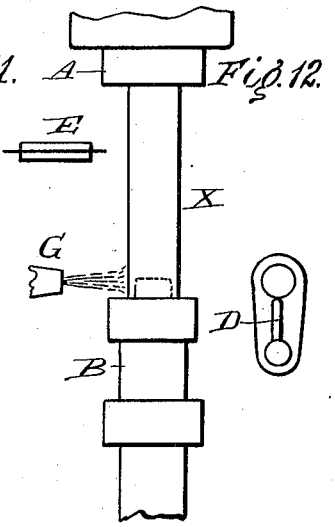
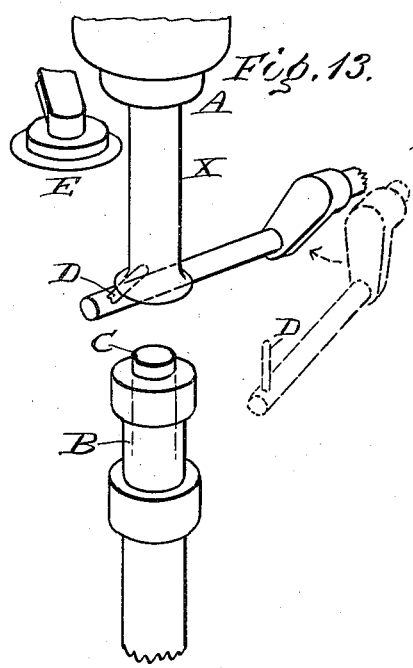
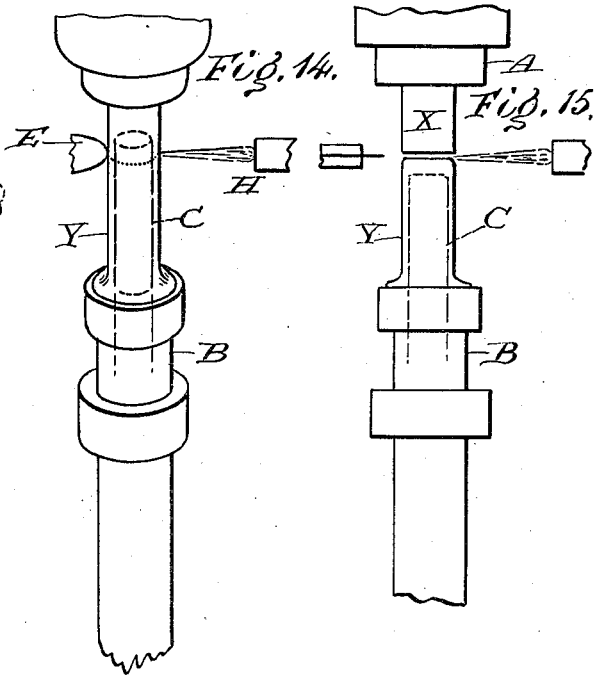
INVENTORS:
Alfred Hofmann & Victor Anderson
BY
Morrison, Kennedy & Campbell
ATTORNEYS.

Sept. 18, 1934.  A. HOFMANN ET AL  1,974,399

MANUFACTURE OF TUBULAR GLASS ARTICLES

Filed May 12, 1932   7 Sheets-Sheet 7

INVENTORS:
Alfred Hofmann & Victor Anderson
BY
Morrison, Kennedy & Campbell
ATTORNEYS.

UNITED STATES PATENT OFFICE 1,974,399

MANUFACTURE OF TUBULAR GLASS ARTICLES

Alfred Hofmann, Palisade, and Victor Anderson, North Bergen, N. J., assignors to Alfred Hofmann & Company, West New York, N. J., a corporation of New Jersey Application May 12, 1932, Serial No. 610,836

27 Claims. (Cl. 49—7)

This invention relates to the manufacture of tubular glass articles, and to this end involves a machine for performing certain operations on a downwardly fed glass tubing supply, illustratively shown as first shaping or flaring the advance or lower end of the supply tube or stock and thereafter severing the tubing at a predetermined distance from or above the flared end, thus producing short sections of flared tubing, known as "flares", useful as components in the construction of lamp bulbs, having reference to lamps or bulbs used for illumination or for radio or other purposes. Certain features however may be useful in manufacturing other products, as small lamp bulbs; and the disclosed principles of flaring and of severing are believed to be novel and useful both in combination and separately. In using terms of position and direction as vertical, downward, lower, etc., they are intended only in a relative sense, throughout this specification, as the principles are operative irrespective of direction or position; and the word glass includes equivalent raw materials.

Among the general objects of the present improvement are to afford a method and machine for manufacturing tubular glass articles of the kind referred to which will be relatively simple in construction and operation, and rugged and durable in use. A particular object is to dispense with the complication as employed in certain existing machines involving a succession of operating stations with a traveling or rotating turret to advance each supply tube and the product during formation from station to station for the successive operations; and to permit all of the operations upon and completion of each product to be performed at a single location, thus avoiding the bodily shift of the supply tube and providing compact and complete independent units, which may be multiplied to any extent to deliver a desired output. A further object is to permit the reduction of the time of operation in the production of each product by performing the successive steps in quick succession thereon, thus not only increasing output but avoiding the otherwise necessary reheating frequently involved in a system using step by step advance from station to station.

Special objects have reference to an improved manner of holding and feeding the supply tube; to the manner of flaring the advance end thereof; to the manner of severing the tubular product from the supply tube, and finishing or smoothing the severed edge; also to the manner of outfeed and delivery of the finished product.

Further advantages of the invention will be elucidated in the hereinafter following description of an illustrative embodiment thereof or will be understood to those skilled in the subject. To the attainment of the aforesaid objects and advantages the present invention consists in the novel method and machine for manufacturing tubular glass articles, and the novel features of operation, combination and construction herein illustrated or described.

In the accompanying drawings Figure 1 is a front elevation of a flare making machine or unit of twin style illustrating the principles of the present invention, the glass stock or tubing and the formed product being omitted.

Fig. 2 is a central section of one of the two tube holding chucks shown in Fig. 1, but in its open position.

Fig. 3 is a right elevation of the machine shown in Fig. 1.

Fig. 4 is a partial left elevation thereof on a larger scale.

Figs. 5 and 6 are perspective views of the flaring device and connections showing successive positions of action.

Fig. 7 is a horizontal section, looking from above, on the line 7—7 of Fig. 3.

Figs. 1 and 3 to 5 and 7 to 9 are shown with the parts in that position or stage of action corresponding with the diagram Fig. 15.

Figs. 10 to 15 are diagrammatic elevations and perspectives showing certain successive positions in the cycle of action in the production of a single article or flare.

Figure 8:
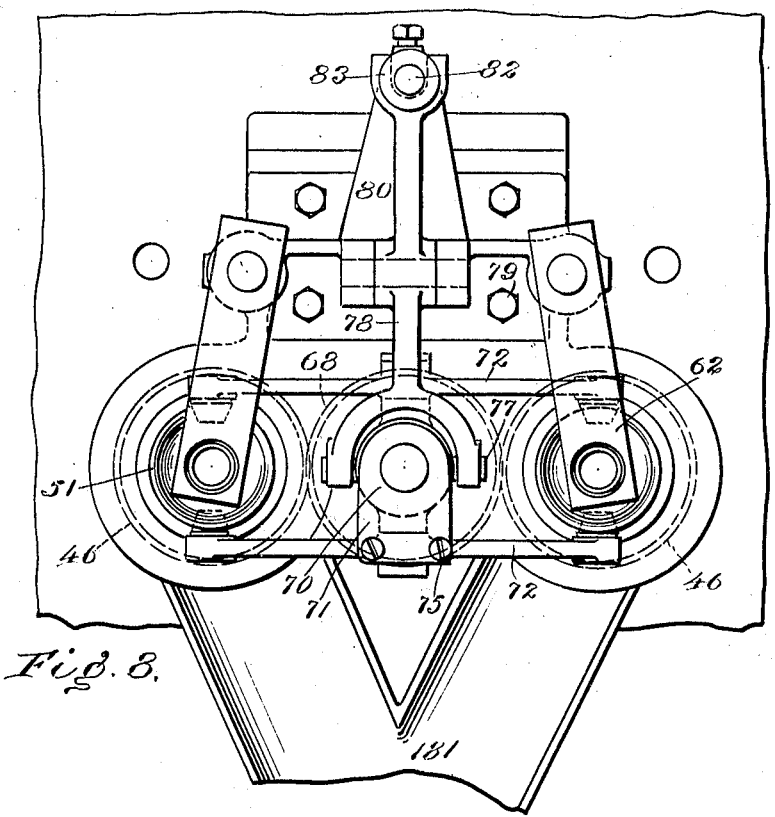
Fig. 8 is a top plan view of the machine, with various parts omitted.

The operating instruments will first be enumerated and their preferred sequence of operation generally explained by reference to the diagrams of Figs. 10 to 15, following which the details of construction and operating connections will be described. The supply tube X is shown as held in a vertical position by the jaws of a rotary chuck A which is shown closed in Figs. 1, 3, 4 and 10, holding the tubing prior to feed. A shiftable feeding member B shown in the form of a sleeve is at its bottom or fully retracted position in Fig. 10. A gaging mandrel C, of a diameter to give a loose fit within the tubing, and changeable for different sizes of tubing, is shown as slidable within the feed sleeve, and in Fig. 10 is at its bottom position; the upper end of the mandrel being maintained always at least as high as the top end of the sleeve to avoid forming a recess wherein glass particles might lodge to the damage of the parts, and at times to prevent accidental displacement of the severed product.

A flaring tool or pencil D is shown in Fig. 10 in its fully retracted position. A severing tool or blade E, preferably an idly rotatable disk, is shown in its laterally retracted position. An outfeeding or knockoff member or bar F is shown as having swung frontwardly and thus knocked off or delivered the finished product or flare Y, shown falling from the feeding sleeve B, to be received in any suitable receptacle. The gas jets or nozzles G for softening the glass for the flaring operation, and the jets H for softening the glass at a higher point for the severing operation, are indicated on Figs. 12 and 14 respectively.

A fixed frame gives support to the several instruments, including the tube holding chuck A, rotating in a fixed position; so that all of the operations may be performed in a single position, in rapid cooperative succession and without shift of the tubing from position to position between operations.

The cycle of operation, commencing for convenience with the position shown in Figs. 1, 3–5 and 7–10, may be substantially as follows, with reference to Figs. 11 to 15 showing certain successive stages. Each complete cycle, for the production of a single flare, may correspond with a single rotation of the main or cam shaft 20 to be described, which may be rotated for example at a speed of 5½ turns per minute and operating through timed connections to deliver 330 articles per hour, or 660 per hour from each twin unit such as shown in Figs. 1 to 8.

The first actions, following the starting position of Fig. 10, are the timed rising of the feeder or feed sleeve B and the gage or mandrel C to their respective topmost positions as shown in Fig. 11, the initiation of these movements being accompanied by the backward swinging of the outfeeder or knockoff bar F idly to a position behind the instruments B and C, the knockoff bar preferably taking its motion from the feed sleeve connections, so that it only swings forwardly to feed out the product as in Fig. 10 when the sleeve drops to its lowest position, the bar F at other times being out of the way behind the sleeve. At their topmost positions, as in Fig. 11, the feed sleeve has preferably risen substantially into contact with the lower end of the tubing X held in the holder or chuck A, the mandrel having risen slightly higher and entered the bore of the tubing, wherein it is to constitute a gage filling the tubing during severing, and like the feeder rotating with the chuck and tube.

The next action is the opening of the chuck, thus releasing the tubing allowing it to advance downwardly by gravity, although any other means of causing the advance could be employed. Immediately the chuck has opened the feed sleeve B drops a predetermined distance to a point, which for convenience will be termed mid position, which determines the length of the tubular product. The amount of descent of the feed sleeve being adjustable permits the manufacture of flares of varying lengths. Simultaneously with the drop of the feed sleeve the mandrel C preferably drops to its mid position. This stage of action is illustrated in Fig. 12.

While in this stage the chuck is caused to close on the tubing, while both are in rotation, holding it against further advance, and the gas jet or nozzle G is turned on to apply heat for softening the lower end of the tubing to permit the flaring or other shaping operation. It is to be understood that the chuck, and preferably the feed sleeve and gaging mandrel, are maintained in fast rotation, all at the same speed, so that the glass tube and all members engaging it rotate in unison, for example at 550 R. P. M. The action described is still illustrated by Fig. 12.

The tubing now being in control of the rotating chuck, the feed sleeve and the mandrel may be retracted in order to clear a space to receive the flarer or other shaping device; and according to this invention such retraction consists in the dropping of these instruments again to their bottom or initial positions, as indicated in Fig. 13; so that all movements of these concentrically mounted elements are preferably vertical movements along a fixed line of action. This dropping movement of the feed sleeve causes the outfeeder or knockoff bar F to swing frontwardly over the top of the feed sleeve, which however is an idle movement, except that it removes the bar from possible interference with the flaring action.

The flaring device or pencil D now comes into action, preferably with three movements, as indicated by comparison of the dotted and full line positions in Fig. 13; first, the device shifts or swings bodily inward to a position below the open lower end of the tubing, second, it lifts bodily so that the pencil enters the tubing, and third, the pencil is tilted to cause the shaping of the softened glass into the flared form shown. In general the described movements of the flaring pencil are similar to those described in expired patent of Fagan 866,347 of September 17, 1907, although herein brought about quite differently as will be described. Following the described action of the flaring pencil its movements will be reversed, restoring it to the dotted line position of Fig. 13; but instead of employing a tilting flaring movement away from the direction of retraction, as shown, it is proposed to give the pencil a tilting motion in the direction of retraction, so that the retraction constitutes a continuation of the flaring motion, thus economizing to a small extent in motion and time in each cycle. The flaring gas jet G will preferably be turned off about the time the flaring action commences, so that the hardening of the glass will follow immediately the completion of the flaring and prevent distortion from centrifugal force or other causes.

The next actions include the rising of the feed sleeve to its mid position, or slightly higher, and the gaging mandrel beyond its mid position and to its topmost position; while simultaneously the severer or cutting disk E is shifted inwardly to effect the cut, the gas jet H having been turned on for this purpose immediately after the completion of the flaring action. Fig. 14 shows the parts in this position, and it will be noticed that the gaging mandrel C, which is a solid firm cylinder, stands somewhat higher than the severing level, so that it substantially fully occupies the tubing and constitutes an effective abutment for the cutting action. The cutting disk is mounted for idle rotation on its supporting arm, but assumes rotation from contact with the fast rotating tubing and progressively cuts its way through the softened glass, as indicated in Fig. 14. Preferably it is applied by spring pressure, under timed control, and is maintained in cutting action for several, e. g., 6 to 10, turns of the tubing and mandrel. The severed section Y rests on the feed sleeve and is occupied by the mandrel.

Following the stage shown in Fig. 14, the cutting disk is retracted away from the tubing and at the same time the gaging mandrel, which has preserved the diameter of the tubing during cutting drops slightly below the cutting level, thus leaving the severed top edge of the flare Y exposed to the flame of the jet H. This is for the purpose of finishing off smoothly the top edge of the flare, the flame softening or "burning" the material so that it is fused and caused to assume a smooth condition. This stage of the parts is indicated in Fig. 15, and corresponds with Figs. 1, 3–5 and 7–9. Immediately thereafter the severing gas jet is turned off while the feed sleeve is dropped to its lowest position and the mandrel at a greater speed to its lowest position, the completion of these movements causing the knockoff bar to swing forwardly and deliver the completed flare from the feed sleeve, as indicated in the Fig. 10 position, to be received in a suitable receptacle.

Before referring to the details of mechanism the main operating cams will be identified on the main or cam shaft 20 appearing in Figs. 1, 3 and 7. Near the center of the apparatus is a cam 21 connected for opening and closing the chuck and with connections also to swing the cutting disk to and from the work. On either side of this central cam are duplicated cams 22, 23 and 24, only those at the right side having their connections completely illustrated. The cam 22 operates to lift and lower the gaging mandrel; the cam 23 lifts and lowers a certain rod which operates the flaring device; and the final or outer cam 24 lifts and lowers the feed sleeve, with a connection to operate the knockoff bar.

The main shaft 20 takes its bearings in drop brackets 27 mounted below the main table or horizontal frame part 28 shown in Figs. 1 and 3–8. Also depending from the table 28 are brackets 29 affording bearings for a high speed or power shaft 30 which may be driven directly from an electric motor. By one set of connections to be described, the power shaft may effect the fast rotation of the chuck, feed sleeve and mandrel, while by another set of connections it may communicate reduced speed drive to the main or cam shaft 20. These latter connections include a worm 31 on the power shaft driving a worm wheel 32 on a cross shaft 33 mounted in drop brackets 34, the cross shaft carrying a bevel gear 35 meshing with a bevel gear 36 on the shaft 20; and while the ratios may be varied, the power shaft may be conveniently run at 550 R. P. M., with a reduction in ratio of 100 to 1, delivering a speed of 5½ R. P. M. to the cam shaft, which therefore goes through a complete cycle in about 11 seconds.

Above the table 28 are various upright brackets or standards including a main or rear standard 40 of considerable height, its upper end having a front bracket 41, at the front end of which is a barrel or casing 42 for holding and permitting rotation of the contained chuck A; and this being a twin unit the bracket 41 carries two of such chuck holding barrels, as best seen in Figs. 1, 2, 3 and 8. Each barrel 42 has its upper part enlarged at 43, with an attached cover 44, this enlargement accommodating the connections by which the chuck is rotated.

Each chuck comprises an outer rotary sleeve 45 fitted within the barrel 42, this sleeve having attached to it a gear 46 by which it is rotated. At its inner side the sleeve 45 is provided with a lower taper 47 and an upper taper 48, each of these acting as a cam to cause the closing of the chuck jaws. Sliding within the outer sleeve 45 is an inner sleeve 50, this having an attached extension 51 at the top by which it may be lifted and lowered; and the inner sleeve and extension are formed with a central bore 52 of suitable size to receive the stock or glass tubing. At the lower end of the inner slidable sleeve 50 are chuck jaws 53, preferably three in number, which may be hung loosely by links so as to be radially movable within slots in the sleeve wall, the outer sides of the jaws formed at an incline to cooperate with the lower cam taper 47 of the outer sleeve. Similarly at the upper end of the inner sleeve are loosely hung jaws 54 working in slots in the inner sleeve, but in the case of these upper jaws cushion elements 55 are introduced, to permit during closing a slight yield relatively to the closing of the lower jaws. By reason of this it is insured that the lower jaws will tightly grip and centralize the tubing at the lower end notwithstanding possible variations in the diameter or shape of the tubing.

A series of three screw studs 56 is arranged to secure together the inner chuck sleeve 50 and its upward extension 51, and the outer ends of these studs are arranged to play in vertical slots 57 in the outer sleeve, thus compelling the two sleeves to rotate in unison, while permitting the inner sleeve to be relatively lifted and lowered for relaxing and closing the jaws. Preferably the closing of the jaws upon the tubing is rendered uniform through resilient action, and for this purpose a coil spring 59 is shown disposed in a recess between the two sleeves and pressing against upper and lower abutments in a manner to thrust down the inner sleeve, so that the cam tapers 47 and 48 will cause the inward thrusting of the chuck jaws 53 and 54. Control may be effected through connections to lift the inner sleeve at proper times and allow it to descend at other times, and for this purpose the top extension 51 is shown as formed with a circumferential groove 60 engageable by yoke studs for lifting and lowering purposes. In Fig. 2 the inner sleeve is shown as lifted to its top position so that the jaws are relaxed and the chuck is in open position to permit the insertion or advance of tubing through it. When tubing X is initially inserted in each of the chucks A the free upward extension of each tube may be steadied and guided by fixed top guides 62 as shown in Figs. 3 and 8.

Describing next the fast rotation of the chucks through the gears 46 formed at the peripheries of the outer chuck sleeves 45 already mentioned, the drive connections commence with the high speed shaft 30, upon which is mounted a helical gear 64 engaging with a helical gear 65 in turn mounted on a vertical high speed shaft 66, as best seen in Figs. 1, 3 and 8. The lower end of the shaft 66 turns in bearings formed on a bracket 67, while near its top end the shaft carries a central gear 68 engaging the two opposite chuck gears 46 and thus turning the two of them in the same direction at substantially the same speed as the power shaft.

For timed control of the chuck opening and closing, through the lifting and lowering of the inner sleeve 50, the following connections may be employed. As seen in Figs. 1, 3 and 8 a generally cylindrical block 70 having a top flange 71 is mounted loosely upon the top end of the shaft 66, and capable of sliding vertically thereon, without partaking of the rotation. The block has pivoted to it front and rear yoke bars 72, each extending both rightward and leftward, so as to constitute, with the block, a sort of yoke for each of the twin chucks, each such yoke having a pair of studs 73 at the ends of the bars 72, engaging in the grooves 60 of the top extensions 51 of the inner chuck sleeves. By this arrangement it is only necessary to lift and lower the block 70 in order to open and close the chucks. As two chucks are shown, and sometimes it may be desirable to operate them upon tubes of different diameter, an adjustment is shown for changing the angle or tilt of the yoke bars 72, so that on lowering the block one chuck may close more tightly than the other. This device consists in a pair of screws 75 extended downwardly through the front corners of the flange 71 and contacting upon the opposite portions of the front yoke bar 72, whereby one screw may be loosened and the other tightened to change the tilt.

Timed connections for lifting and lowering the block 70 and thereby opening and closing the chucks may include trunnion pins 77 at the right and left sides of the block 70, said pins engaged by the forked extremities of the yoked front end of a walking beam lever 78 extending rearwardly and centrally fulcrumed on a bracket 79 mounted on top of the bracket 41, said bracket 79 having also a rear extension 80. The block 70 and the front end of the walking beam are sufficiently depressed by the gravity of the chuck parts and by the chuck closing springs 59. It is therefore only necessary to depress the rear end of the walking beam 78 in order to lift the block and open the chucks. For this purpose there is shown a vertical slide rod 82 passing through the rear portion 80 of the bracket 79 and at its upper end carrying adjustably a contact piece or block 83 which bears down upon the rounded extremities of the fork at the rear end of the walking beam. At its lower end the slide rod 82 is formed with a fork 84 which straddles the cam shaft 20 for guidance and which carries a cam roll 85 traveling in and following the groove of the cam 21 on the shaft 20. The contour of the cam is indicated in Fig. 3 and its timing may be somewhat varied so long as it affords chuck opening and closing actions before and after the feeding period of the cycle as already described.

The follower 85 and rod 82 are shown in a neutral position, wherein the contact block 83 may be spaced slightly above the normal position of the walking beam lever 78 when the chuck is closed. These parts are about to be lowered to open the chuck; while at a later point they will be raised above neutral position by the cam 21 to cause the operation of the severing cutter without effect upon the chuck, the same rod 82 thus performing two independent operations in separate ranges of its vertical sliding movement.

Referring next to the feed sleeve B and its connections, these are shown in Figs. 1, 3, 4 and 7. This feeding member is shown as comprising an interchangeable head 88 secured at the top end of a slidable and rotatable tubular body 90, the head being in the nature of a cap and its annular top surface preferably being padded to receive the tubing and the flare with minimum danger of breaking. Somewhat below the head 88 is a flange 89 cooperating with the outfeeder to be described. The tubular body or shank 90 of the feed sleeve is subject to extensive up and down movements as shown by comparison of Figs. 10 and 11. For this purpose it is slidably mounted in an upper bearing block 91 above the table 28 and a lower bearing block 92 extended from a bracket 93 below the table. At its lowest end the feed sleeve is formed with a grooved collar 94 by which the sleeve may be lifted and lowered during rotation. A fork 95 is shown having studs engaging the groove 94, the fork being carried at the front end of a lever 96 having a suitable rear pivot and carrying a roll or follower 97 cooperating with the cam 24. The cam 24 is shown as an open cam; and the lever has a spring 98 holding it to the cam. The contour of the cam 24 is clearly indicated in Fig. 3, there being dwells at three different distances from the center giving timed motions in accordance with the cycle already described.

For the purpose of rotating the feed sleeve it is shown as surrounded by a gear 100 located above the bearing block 92, this gear having a key or tooth 101 engaging an elongated groove 102 in the tubular body of the feed sleeve, so that the gear may continue to turn the sleeve notwithstanding vertical movements of the latter. As indicated in Figs. 1 and 7 the central vertical shaft 66 carries a gear 104 which meshes with the gear 100, at each side, thus communicating to the feed sleeve a rotation of the same speed and direction as that of the chucks.

Describing next the gage, mandrel or plunger C and its connections, this instrument is shown as a vertical cylindrical rod 108 extending through the hollow interior of the feed sleeve 90 and head or cap 88. At its lower end the rod 108 is formed with a grooved collar 109 the same engaged by the forked end 110 of a lever 111 swinging on a rear fulcrum and provided with a cam roll or follower 112 engaging the cam 22. For convenience this is shown as an open cam and the lever has a spring 113 holding its follower up against the cam.

In order to prevent the gage mandrel from rising too far, or any further than illustrated in the diagrams Figs. 11 and 14, a stop 115 may be provided comprising an adjusting screw, and so located as to be contacted by the lever 111 on reaching the desired limit of rising movement. In order to maintain the rotation of the rod 108 or gage mandrel it is shown as formed with a vertical groove 117 engaged by an inwardly projecting key or tooth 118 of the rotating feed sleeve 90, thus permitting relative sliding between them and maintaining the desired rotation.

The shaping or flaring device D comprises a finger or pencil 121 adapted to enter the softened tubing and tiltingly turn it out in the form of a flare. The threefold movement already described may be effected by the following mountings and connections. The pencil 121 is shown as mounted in an upright radial position upon an elongated crank pin 122 extending horizontally from a crank arm 123 mounted on a rock shaft 124, said rock shaft having its bearing in a pair of spaced ears 125 formed at one side of a cylindrical sleeve or block 126 capable of oscillation and vertical sliding. The block or carrier 126 is mounted in a special way near the top of a vertical operating rod 128, to the top end of which rod is secured a collar 129 engaged with the under side of which is the block 126 held up by a lifting spring 130. This permits the rod and carrier sleeve to oscillate together and to move up and down together, while permitting the rod to move upwardly relatively to the sleeve in the last part of its rise. The rod 128 or its collar 129 carries a short vertical rack 131 located between the ears 125 of the sleeve. This serves the double purpose of compelling the rod and sleeve to turn together, and of affording a cooperative action between the rack and a pinion 132 mounted on the rock shaft 124 between the ears, namely when the rod and rack rise relatively to the sleeve or carrier.

The several operative movements of the flaring device are effected by the lifting and lowering of the rod 128, and this movement will first be described. The rod is shown as extending slidingly through a fixed bearing standard 134 mounted at the top side of the table 28, the lower end of the rod projecting below the table and there carrying a grooved collar 135, Figs. 1 and 3, engaged by the forked end of the horizontal arm of a bell crank lever 136, the vertical arm of which carries a follower 137 engaging the cam 23 on the main shaft 20. For convenience of illustration an open type cam is shown, and a spring 138 pulls upon the lever to hold the follower to the cam. The cam will be seen to have a contour affording up and down movements of the rod 128 in proper time to carry out the flaring operation in its correct sequence.

As already indicated the successive movements of the flaring finger comprise first a bodily swinging to a position vertically beneath the glass tubing, then a bodily lifting until the finger enters the tubing, then a tilting to produce the flared shape, and then reverse movements to initial position. All of these actions are herein afforded by a single lifting movement of the operating rod 128. The first two movements occur as the rod and carrier sleeve lift from the Fig. 5 to the Fig. 6 position. When this position is reached the rise of the sleeve is stopped by reason of a slotted extension 140 of the sleeve coming up against the head of a stop bolt 141 adjustably clamped between ears 142 outstanding from the bracket 134. As the rod rises beyond the full line position of Fig. 6 to the dotted line position, the rack 131 lifts relatively to the pinion 125, thus turning the rock shaft 124 and giving the tilting movement to the pencil 121. Before this tilting movement, however, the inswinging and lifting movements are effected, for example as follows. A fixed cam 145 is shown attached to the standard 134. This cam has a first or inclined slot portion 146 followed by a vertical slot portion 147. The sleeve 126 carries a cam pin 149 normally engaging the lower end of the inclined slot 146, as best shown in Figs. 3 and 5.

With this arrangement, when the actuating rod 128 starts to rise, carrying with it the carrier sleeve 126, the pin 149 rides around in the inclined slot 146 thus causing the bodily rotation of the sleeve and the parts carried by it, and as well the rod 128 with its collar 129. This bodily swinging affords the shifting movement to bring the flaring pencil 121 beneath the glass tubing. The continued rise of the rod causes the cam pin 149 to ride vertically in the slot 147. The pencil 121 is thus held vertical while being lifted into the inside of the glass tubing. The stop bolt 141 determines the limit of this rising movement. Following the stopping of the lift of the carrier sleeve, the rod 128, continuing to rise, causes its rack 131 to revolve the pinion 132 so that the pencil carried by the crank 122 is tilted about the shaft as a center, as shown in dotted lines in Fig. 6. This tilting motion acts upon the softened glass to spin it outwardly into the desired flare. Immediately the rod 128 may descend and the three movements are reverse, bringing the parts back to the normal position of Fig. 5.

Referring to the modification of the flaring device shown in Figs. 16–19, this involves, instead of the return spring 138 controlling the action, a friction device consisting of one or more friction buttons or pads 133 mounted on the carriage or block 126, the mounting comprising a spring 133ª pressing the friction buttons against the reciprocating rod 128. The friction thereby causes the carriage to ascend and descend with the rod except when controlled by the stops, an upper stop or head 143 being shown on the stop bolt 141 and a second or lower stop 144 in the form of lock nuts at a suitable distance further down on the bolt.

With this arrangement the movements of the flaring finger in relation to the gaging mandrel and feed sleeve are improved. The inclined fixed cam 146 may be extended so as to combine the lifting and swinging movements of the flaring device which thereby is brought quickly upward into position within the glass tube.

When the rod or plunger 128 ascends this first causes the carriage or block 126 to rotate, swinging the flaring pencil into position as it rises beneath the glass tube. The bolt head 143 stops the upward movement of the carriage and the swinging movement, while the continued ascent of the rod 128 causes the revolving of the shaft 124 and thereby the tilting of the pencil as before. After the flaring the rod 128 moves down. The friction device causes the carriage to start down with it, the pencil however remaining tilted as will be clear by comparing Figs. 17 and 18. When the slotted extension 140 strikes the lower bolt stop 144 this stops the carriage at its lowermost position, the friction thereafter yielding so that the continued descent of the rod, through the rack 131 and pinion 132 will revolve the shaft 124 and tilt the pencil 121 back into normal vertical position.

The severing device E is shown as a severing blade 152 clamped between circular plates 153 and mounted for loose rotation at the free end of a swinging arm 154 as best shown in Figs. 1, 3, 4 and 7. These blades and levers are in pairs as seen in Fig. 7 and each has a tail 155 extending beyond the fulcrum with an upstanding pin pulled forwardly by a spring 156, anchored to a post 157, this spring therefore giving a resilient pressure causing the blade to bear against the softened glass tubing. The two swinging arms 154 may be interconnected by a loose pin and slot connection 154ª causing them to retract simultaneously but permitting relative play during cutting.

The cutter blade lever 154 is shown mounted at the top end of a vertical shaft 158 mounted for rotation in top and bottom bearings 15⁹ and 160 mounted on the standard 40 and table 28 respectively. Near its lower end the fulcrum shaft 158 is formed with a collar 162 from which extends toward the center a stud 163 having a spherical head, best shown in Figs. 1 and 4. The free end of the stud 163 is shown engaged in the fork 166 formed on the upright arm of a bell crank lever 167 mounted on a fixed bracket, with a horizontal rearward arm carrying a roll 168 adapted at times to be depressed by a flange or projection 169 secured to the vertical moving rod 82. The lowering of the rod swings the bell crank to rock the shaft 158 and thereby withdraw the cutter blade from operative position, while a spring 170 is arranged to oppose this motion and rock the shafts to restore the cutter to cutting position, upon the rise of the rod 82.

Thus in its upper range of movement the lift of the rod 82 brings about the operation of the severing blade, while in its lower range, while the severer is inoperative, as already described, the rod effects the opening of the rotary chuck. These two actions occurring at separated points in the cycle the same cam 21 is utilized for both movements.

The outfeeding or delivery of tubular products may be effected in various ways, but is shown as performed by the movements of a curved bar 175 constituting the knockoff device F. See Figs. 1, 3, 4 and 7. This is mounted at the upper end of a lever 176 fulcrumed at the top end of a fixed post 177, with a spring 178 pulling the device rearwardly, and with a lateral pin 179 adapted to be struck by the flange 89 near the top of the feed sleeve as the latter descends. Whenever the feed sleeve drops to its lowest position its flange contacts the pin 179 and swings the bar 175 frontwardly over the top of the feed sleeve, thus knocking off the glass product, which may pass down by a chute 181 to a convenient receiving point.

Figure 9:
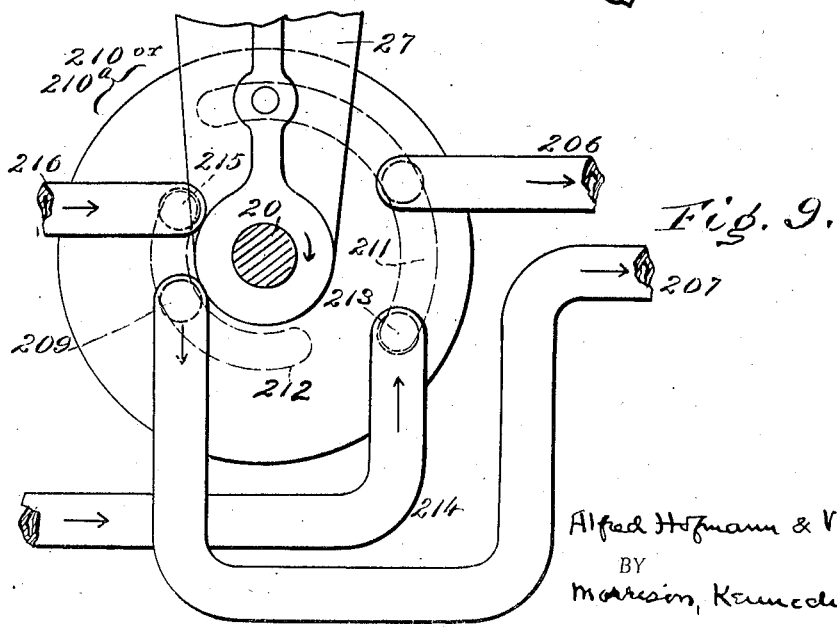
Fig. 9 is a right elevation of the heating gas control valve.
Figure 16:
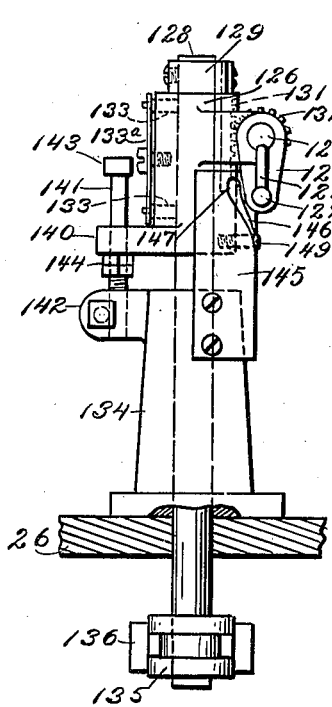
Figs. 16, 17 and 18 are front views of a modified flaring device in successive positions.
Figure 17:
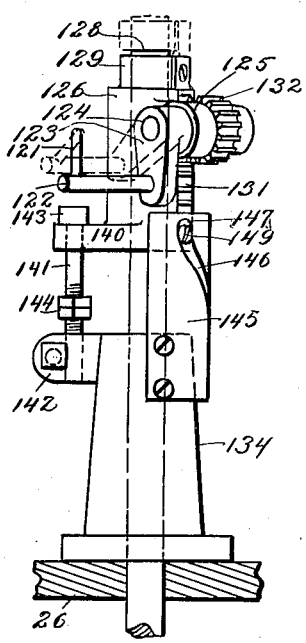
Figure 18:
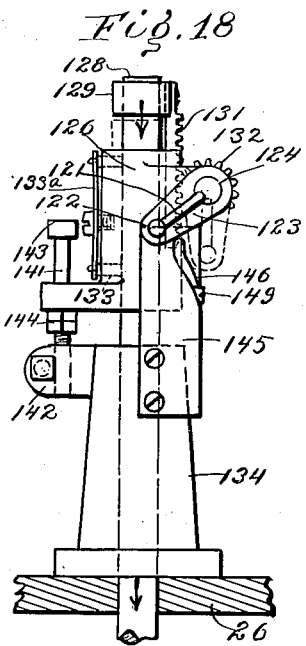
Figure 19:
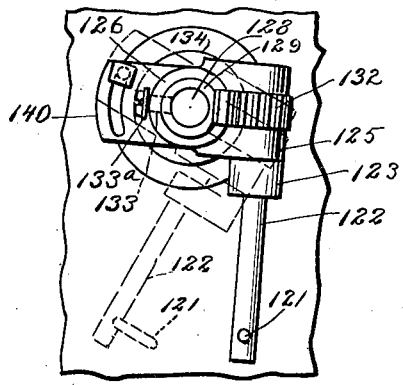
Fig. 19 is a top view of the same showing different positions in full and dotted lines.

Referring next to the timed supply of gas or mixture of gas and air to the several heating jets, the jets G used for flaring are shown supplied by a distributing box 200 for each pair of jets, each box mounted on an adjustable fixture 201 and being supplied with a gas-air mixture by a flexible tube 202. The two tubes 202 are shown in Fig. 3 as coming from a mixing box 203 which has a valve 204 for regulating the feed of gas and a valve 205 for regulating the feed of air into the box. The gas is supplied to the gas valve through a flexible tube 206 and the air to the air valve by a similar tube 207. In Fig. 9 the gas and air tubes 206 and 207 are shown as being fed through gas and air ports 208 and 209 formed in the wall of a rotary timing valve 210. The port 208 is supplied directly from a valve groove 211 for gas, while the port 209 is fed by an air groove 212. The gas groove 211 is supplied by a gas inlet port 213 fed by a gas supply tube 214; while the air groove 212 is fed by an air inlet port 215 supplied by an air supply pipe 216. The air and gas supply pipes 214 and 216 deliver under pressure. The valve 210 effects the proper timing, turning on and off the air and gas simultaneously for the desired part of each cycle, while the mixing is effected at the box 203 and the mixture fed through the tubes 202 to the heating jets.

The cutting jets H may be supplied and timed in an entirely analogous manner through flexible tubes 202ª fed from a mixing box 203ª behind the box 203, this in turn supplied by flexible tubes 206ª and 207ª for gas and air respectively, furnished under correct timing by a valve 210ª similar to that represented in Fig. 9 and accommodated adjacent thereto.

The two sets of gas jets in each twin unit may be operated simultaneously, but the cycle in the next adjacent twin unit should be timed differently, so that the gas supply is not required to feed all of the jets at once, which would cause undue drop of gas pressure and effectiveness of action. For example one unit may be timed 180° behind another; or the operations may be staggered further, for example by four different timings at 90° spacing, thus maintaining a substantially continuous gas flow, in rotation to the different sets of jets.

The preferred operation has been indicated in detail. It embodies the method consisting in advancing the tubing (downwardly) along a given (vertical) feed line and stopping the feed after an extent corresponding with the desired length of product, followed by heat-softening the (lower) end of the tubing and then flaring or otherwise shaping it and allowing it to harden; subsequently filling the bore of the tube by a mandrel adapted to preserve its diameter, and then, with the tubing in the same feed line, heat-softening it at a predetermined (higher) point or level and mechanically applying exterior cutting pressure at such point toward the interior mandrel to sever the product, which is then allowed to harden and then delivered. Preferably as stated the top severed edge of the product is further heat-softened to smooth it before delivery.

Among many modifications falling within the broad scope of the invention are the following. The advance or feed of tubing may be done mechanically or positively instead of relying upon gravity controlled by the feed member. The feed member may take various forms so long as it governs the extent of feed, and its retraction to admit the flaring tool may be lateral rather than downward. The gaging mandrel may be operated independently of the feed member rather than sliding within it, and may for example be inserted in the tubing from above after the tubing is in place. The flaring tool may be replaced by any any other means for shaping the heat-softened lower end of the tubing. The severing means may be a straight blade or one subjected to movement during cutting. The severing action may be effected at the same level as the flaring action with the feed action interposed between them. The outfeed means may positively grip and convey the product away from its severed position to a receptacle. The disclosed details and specific forms however are preferred as affording greater simplicity, ruggedness, speed or efficiency.

There has thus been described a machine for the manufacture of tubular glass articles of the kind described, the same embodying the principles and attaining the recited objects of the invention. Since many matters of operation, combination and construction may be variously modified without departing from the novel principles, it is not intended to limit the invention to such matters except to the extent set forth in the appended claims.

What is claimed is:

1. A machine for manufacturing hollow products from glass tubing, comprising a rotary holder through which the tubing may advance downwardly in a given feed line, a driving member or shaft, timed means operated from the driving member for causing a predetermined downfeed of tubing in said feed line, timed means operated from the driving member for thereafter shaping the lower end of the downfed tubing while rotated in said feed line, timed means operated from the driving member for thereafter severing the downfed tubing in said feed line at a point above its shaped lower end, and timed means for heat-softening the downfed tubing preceding the operations of the shaping means and severing means respectively.

2. A machine for manufacturing hollow products from glass tubing, comprising a driving member or shaft, a rotary holder through which the tubing may advance downwardly in a given feed line and in which the tubing is held in said feed line throughout the operation of the following recited mechanisms, timed mechanism operated from the driving member for shaping the lower end of the tubing while rotated in the said feed line, timed mechanism operated from the driving member for severing the tubing in the said feed line at a point above its shaped lower end, timed mechanism operated from the driving member for causing a predetermined downfeed of tubing in said feed line before severing, and timed means for heat-softening the tubing preceding the operations of the shaping means and severing means respectively.

3. A machine for manufacturing hollow products from glass tubing, comprising a rotary holder through which the tubing may advance downwardly in a given feed line, timed means for shaping the lower end of the tubing while rotated in said feed line and thereupon retracting, a gaging mandrel of the full bore of the tubing adapted to occupy the tubing whereby to present a cylindrical abutment surface at the severance line and to steady the product during and after severance, timed means for inserting the gaging mandrel in the tubing beyond the severance line after the retraction of the shaping means, timed means operating after said inserting means for severing the tubing in said feed line at a point above its shaped lower end, comprising a blade operating against the mandrel as an abutment, timed means for causing a predetermined downfeed of tubing in said feed line before severing, and timed means for heat-softening the tubing preceding the operations of the shaping means and severing means respectively.

4. A machine for manufacturing flared hollow products from glass tubing, comprising a rotary holder through which the tubing may advance downwardly, timed means for flaring the lower end of the tubing while rotated in said holder, and thereupon retracting, a gaging mandrel mounted to rotate about a fixed axis in alinement with that of the holder and having a cylindrical portion adapted to occupy and substantially fill the tubing whereby to present a cylindrical abutment surface at and above and below the severance line and to steady the product during and after severance, and having connections to rotate it bodily at the same rotary speed and concentrically with the holder and tubing during severing, timed means for inserting the rotated gaging mandrel in the tubing beyond the severance line after the retraction of the flaring means, timed means operating after said inserting means for severing the tubing at a point above its flared lower end, comprising a blade operating against the cylindrical periphery of the mandrel as an abutment, timed means for causing a predetermined downfeed of tubing before severing, and timed means for heat-softening the tubing preceding the operations of the flaring means and severing means respectively.

5. A machine for producing flares or like articles from glass tubing comprising, a fixed frame, a tube-holding chuck mounted in the frame for rotation on a fixed vertical axis, timed means for opening the rotary chuck for down-feed of tubing and closing it after such feed, a feed member or sleeve shiftable down-and-up beneath the chuck, timed means for causing the feed member to rise to receive the tube and descend to determine the extent of feed and then to retract after the feed, and after the flaring to return to position to receive the flared tube before severing thereof, and thereafter to retract with the severed product, a gaging mandrel shiftable up and down beneath the chuck, having a diameter substantially to fill the tube, timed means for causing the mandrel to rise and enter the tube and rise therein above the severing level before severing and to descent after severing, means for maintaining rotation in unison of the chuck, the feed member and the gaging mandrel, a flaring tool shiftable to and from position beneath the chuck, timed means for causing the flaring tool to shift to position after the retraction of the feed member and to enter and flare the lower end of the tube and then retract, a severing blade having timed means causing it to shift to the tube and effect the severing thereof by cutting pressure toward the mandrel and thereafter to retract, means having timed operation after the severing and after the retraction of the feed member with the severed product for delivering the product from the feed member, and heating means for softening the glass tube at the flaring and severing points respectively preceding the flaring and severing operations.

6. A machine as in claim 5 and wherein the heat softening means is applied to the severed top edge of the product after the descent of the mandrel for smoothing the same before delivery.

7. A machine for producing flares or like articles from glass tubing comprising, a rotary tube-holding chuck, timed means for releasing the chuck for down-feed of tubing and closing it after such feed, a feed member shiftable down and up beneath the chuck, timed means for causing the feed member to take a predetermined position to determine the extent of feed and to retract after the feed, and after the flaring to return to position to receive the flared tube before severing thereof, and thereafter to retract with the severed product, a gaging mandrel shiftable up and down axially of the chuck, having a diameter substantially to fill the tube, timed means for causing the mandrel to occupy the tube at the severing level before severing, means for maintaining rotation in unison of the chuck, the feed member and the gaging mandrel, a shaping tool shiftable to and from position beneath the chuck, timed means for causing the shaping tool to shift to position after the retraction of the feed member and to shape the lower end of the tube and then retract, a severing blade having timed means causing it to shift to the tube and effect the severing thereof by cutting pressure toward the mandrel and thereafter to retract, means having timed operation after the severing and after the retraction of the feed member with the severed product for delivering the product from the feed member, and heating means for softening the glass tube at the flaring and severing points respectively preceding the flaring and severing operations.

8. A machine for producing flares or like articles from glass tubing comprising, a rotary tube-holding chuck, a feed sleeve shiftable down and up beneath the chuck, timed means for causing the feed sleeve to rise to receive the tube and descend to determine the extent of feed and then to retract after the feed, and after the shaping to return to position to receive the shaped tube before severing thereof, and thereafter to retract with the severed product, a gaging mandrel shiftable up and down within the feed sleeve, having a cylindrical diameter substantially to fill the tube, timed means for causing the mandrel to enter the tube and rise therein above the severing level before severing and to descend after severing, means for maintaining rotation in unison of the chuck, the feed member and the gaging mandrel, a shaping or flaring tool shiftable to and from position beneath the chuck, timed means for causing the shaping tool to shift to position after the retraction of the feed member and to shape the lower end of the tube and then retract, and a severing blade having timed means causing it to shift to the tube and effect the severing thereof by cutting pressure toward the mandrel and thereafter to retract.

9. A machine for producing tubular articles from glass tubing comprising, an upright rotary tube-holding chuck, an upright feed sleeve shiftable axially beneath the chuck, timed means for causing the feed sleeve to rise to receive the tube and descend to determine the extent of feed, and after the severing to retract with the severed product, a cylindrical gaging mandrel shiftable up and down within the feed sleeve, having a diameter substantially to fill the tube, timed means for causing the mandrel to rise above the feed sleeve and enter the tube and rise therein to above the severing level before severing and to descend after severing, and a severing blade having timed means causing it to shift to the tube and effect the severing thereof by cutting pressure toward the mandrel and thereafter to retract.

10. A machine for producing flares or like articles from glass tubing comprising, a fixed frame, a tube-holding chuck mounted in the frame for rotation on a fixed vertical axis, timed means for opening the rotary chuck for down-feed of tubing and closing it after such feed, a rotary feed member shiftable down and up axially beneath the chuck, timed means for causing the feed member to rise to receive the tube and then descend to determine the extent of feed and then to retract after the feed, and after the shaping to return to position to receive the shaped tube before severing thereof, and thereafter to retract with the severed product, a shaping tool shiftable to and from position beneath the chuck, timed means for causing the shaping tool to shift to position after the retraction of the feed member and to shape the lower end of the tube and then retract, and severing means having timed means causing it to effect the severing of the tube.

11. A machine for producing flares or like articles from glass tubing comprising, a fixed frame, a tube-holding chuck mounted in the frame for rotation on a fixed vertical axis, timed means for opening the rotary chuck for down-feed of tubing and closing it after such feed, a rotary feed member shiftable down and up axially beneath the chuck, timed means for causing the feed member to rise to receive the tube and then descend to determine the extent of feed and after the severing to retract with the severed product, and severing means having timed means causing it to effect the severing of the tube before the final retraction of the feed member.

12. A machine for producing flares or like articles from glass tubing comprising, a rotary tube-holding chuck, a feed member shiftable down and up beneath the chuck, timed means for causing the feed member to rise to top position to receive the tube and descend to midway position to determine the extent of feed and then to descend to bottom position after the feed, and after the shaping to rise to midway position to receive the shaped tube before severing thereof, and thereafter to descend to bottom position with the severed product, means for maintaining rotation in unison of the chuck and the feed member, a shaping or flaring tool shiftable to and from position beneath the chuck, timed means for causing the shaping tool to shift to position after the descent to bottom position of the feed member and to shape the lower end of the tube and then retract, a severing blade having timed means causing it to shift to the tube and effect the severing thereof and thereafter to retract, and a knockoff bar for outfeeding of severed products, the same mounted to shift across the top of the feed member when near bottom position, and means actuated by the descent of the feed member when near bottom position for causing the actuation of the knockoff bar to remove the finished product from the feed member to a suitable receptacle.

13. A machine for producing flares or like articles from glass tubing comprising, a rotary upright tube-holding chuck, timed means for causing a predetermined downfeed of tubing, a shaping or flaring tool shiftable to and from position beneath the chuck, and means for causing the shaping tool to shift to position and to rise and shape the lower end of the tube, and then retract, comprising a vertically slidable actuator rod, timed means for shifting the actuator for the shaping operation and then returning it, and connections between the actuator and shaping tool whereby the shift of the actuator effects the successive motions of the tool in sequence and the retraction of the tool; such connections comprising a block oscillating on the rod, the block carrying a shaft rotatable thereon, the shaping tool being carried by the shaft and tilted by the rotation thereof, timed means for elevating the rod through three stages, cam means operating in the first stage for oscillating the block to swing the shaft and tool beneath the tube, and in the second stage for bodily lifting the block to elevate the tool to the tube, and yielding means operating in the third stage for rotating the shaft in the block to tilt the tool and shape the tube.

14. A machine for producing flares or like articles from glass tubing comprising, a rotary upright tube-holding chuck, timed means for causing a predetermined downfeed of tubing, a shaping or flaring tool shiftable to and from position beneath the chuck, and means for causing the shaping tool to shift to position and to rise and shape the lower end of the tube, and then retract, comprising a vertically slidable actuator rod, timed means for shifting the actuator for the shaping operation and then returning it, and connections between the actuator and shaping tool whereby the shift of the actuator effects the successive motions of the tool in sequence and the retraction of the tool; such connections comprising a block oscillating on the rod, the block carrying a shaft rotatable thereon, the shaping tool being carried by the shaft and tilted by the rotation thereof, timed means for elevating the rod through three stages, cam means operating in the first stage for oscillating the block to swing the shaft and tool beneath the tube, and in the second stage for bodily lifting the block to elevate the tool to the tube, friction means between the rod and block permitting relative yield, stop means to stop the block before the rod ceases rising, means operating in the third stage during such friction yield for rotating the shaft to tilt the tool, and a second stop arranged to stop the block at the end of its descent, whereby the final descent of the rod restores the shaft and tool to normal.

15. A machine for manufacturing hollow products from glass tubing, comprising a rotary tube holder through which the tubing may feed downwardly, a feed member shiftable down and up beneath the holder, timed means causing the feed member to rise to receive the tubing and descend to determine the extent of feed and after the severing to retract, with the severed product, a mandrel shiftable up and down, having a diameter substantially to fill the tubing bore, with means rotating it at the same rotary speed with the tubing, timed means causing the mandrel to rise above the feed member and within the tubing to beyond the severing level, where it bodily fills the tubing to steady it and serve as a passive abutment during severing, and after the severing causing the mandrel to descend, means for heat-softening the tubing at the severing level, and a severing blade having timed means causing it to shift to the tubing and effect its severing by cutting pressure toward the mandrel and thereupon to retract.

16. A machine as in claim 15 and wherein the severing blade consists of an idly rotary cutting disk of light weight set into rotation by its contact with the rotated tubing.

17. A machine for manufacturing hollow products from glass tubing, comprising a rotary tube holder through which the tubing may feed downwardly, a feed member shiftable down and up beneath the holder, timed means causing the feed member to rise to receive the tubing and descend to determine the extent of feed, a mandrel shiftable up and down, having a diameter substantially to fill the tubing bore, with means rotating it at the same rotary speed with the tubing, timed means causing the mandrel to rise above the feed member and within the tubing to beyond the severing level, where it bodily fills the tubing to steady it and serve as a passive abutment during severing, and after the severing causing the mandrel to descend, means for heat-softening the tubing at the severing level, and a severing blade having timed means causing it to shift to the tubing and effect its severing by cutting pressure toward the mandrel and thereupon to retract; the mandrel and feed member acting to position and support the severed product until the mandrel relatively retracts out of the product for the discharge of the product.

18. A machine for manufacturing hollow flared products from glass tubing, comprising a rotary tube holder through which the tubing may feed downwardly, a feed member shiftable down and up beneath the holder, timed means causing the feed member to rise to receive the tubing and descend to determine the extent of feed, timed shaping means for flaring the tubing lower end after its downfeed and thereupon operated to retract from the tubing to a lateral position, a mandrel shiftable up and down, having a diameter substantially to fill the tubing bore, with means rotating it at the same rotary speed with the tubing, timed means acting after the retraction of the shaping means to cause the mandrel to rise above the feed member and within the tubing beyond the severing level, where it bodily fills the tubing and serves as a passive abutment during severing, and after the severing to cause the mandrel to descend, a severing blade having timed means causing it to shift to the tubing and effect its severing by cutting pressure toward the mandrel and thereupon to retract, and means for heat-softening the tubing before the flaring and severing operations.

19. A machine for manufacturing hollow shaped products from glass tubing, comprising a rotary tube holder through which the tubing may feed downwardly a feed member shiftable down and up beneath the holder and adapted to receive the severed product, timed means causing the feed member to rise to receive the tubing and descend to determine the extent of feed, and timed means for severing the tubing above its lower end, leaving the severed product resting on the feed member.

20. A machine for manufacturing hollow products from glass tubing, comprising a rotary tube holder through which the tubing may feed downwardly, means determining the downfeed for each product, a mandrel shiftable up and down, having a diameter substantially to fill the tubing bore, with means rotating it at the same rotary speed with the tubing, timed means acting to cause the mandrel to enter and rise within the tubing beyond the severing level, where it bodily fills the tubing and serves as a passive abutment during severing, and after the severing to cause the mandrel to descend, a severing blade having timed means causing it to shift to the tubing and effect its severing by cutting pressure toward the mandrel and thereupon to retract, and means for heat-softening the tubing before severing.

21. An automatic machine for producing successive short tubular products from glass tubing, comprising a tube holder or chuck having connections for rotating it, timed means for feeding successive lengths of tubing through the holder for the successive products, and means for heat softening the tubing at the place where it is to be severed, and characterized by a mandrel with a cylindrical diameter to occupy and substantially fill the bore of the tubing and having connections for rotating it bodily with the rotating tubing, whereby the mandrel acts to steady and hold in line the tubing during heat softening and as an abutment during severing, and a cutting blade having timed means pressing it against the softened tubing while backed and passively opposed by the mandrel to sever the product.

22. A machine as in claim 21 and wherein the mandrel has timed means for elevating it into the upright tubing before severing and lowering it from the tubing after severing, and the feeding means comprising a feed member determining the downfeed of tubing before severing and after severing cooperating with the mandrel to uphold the severed product while the mandrel lowers to permit discharge from the feed member.

23. A machine for producing flares or like articles from glass tubing comprising, a rotary upright tube-holding chuck, timed means for causing a predetermined downfeed of tubing, a shaping or flaring tool having a normal retracted position laterally removed from the feed line and shiftable bodily laterally to and from position beneath the chuck, and timed means acting in each cycle for causing the shaping tool first to shift laterally to position beneath the tubing and then to rise and shape the lower end of the tube, and then retract, comprising a single actuator or sliding rod, timed means for shifting the actuator for the shaping operation and then returning it, and connections between the actuator and shaping tool whereby the shift of the actuator effects the lateral and then the rising and shaping motions of the tool in sequence and the retraction of the tool to normal position.

24. A machine as in claim 23 and wherein is a mandrel having timed means causing it to rise within the tubing when the flaring tool is retracted to steady the tubing and take part in the severing thereof and thereafter descend sufficiently to admit the flaring tool, and a cutting tool having timed means causing it to press upon and sever the tubing while occupied by the mandrel.

25. A machine for producing flares or like articles from glass tubing comprising, a rotary upright tube-holding chuck, timed means for causing a predetermined downfeed of tubing, a shaping or flaring tool shiftable to and from position beneath the chuck, and means for causing the shaping tool to shift to position and to rise and shape the lower end of the tube, and then retract, comprising a shiftable rod, timed means for shifting the rod for the shaping operation and then returning it, and connections between the rod and shaping tool whereby the shift of the rod effects the successive motions of the tool in sequence and the retraction of the tool; such connections comprising a block on the rod, the block carrying a shaft on which the shaping tool is mounted and which is rotatable to tilt the tool, timed connections for shifting the rod through three stages, means operating in the first stage for oscillating the block to swing the shaft and bring the tool beneath the tubing and in the second stage for elevating the tool within the tubing, and means operating in the third stage for rotating the shaft to tilt the tool to shape the tubing.

26. An automatic machine for producing successive short tubular products from glass tubing, comprising a tube holder or chuck having connections for rotating it, a feed member for feeding successive lengths of tubing through the holder for the successive products, and for sustaining each product during and after severing, timed means for heat softening the tubing at the place where it is to be severed, a mandrel with a cylindrical diameter to occupy and substantially fill the bore of the tubing and having connections for rotating it bodily with the rotating tubing, whereby the mandrel acts to steady and hold in line the tubing during heat softening and as an abutment during severing, a cutting blade having timed means pressing it against the softened tubing while backed and passively opposed by the mandrel to sever the product, leaving it sustained upon the feed member and occupied by the mandrel, timed means for lowering the mandrel relatively to the feed member after severing to release the product for discharge, and timed means for removing the product from the feed member to discharge it before the next feeding operation.

27. A machine as in claim 26 and wherein the feed member is shiftable and has timed means retracting it after each feeding operation to make clearance for a shaping operation and thereafter restoring it, and shaping mechanism having timed means operating while the feed member is retracted for bodily shifting the shaping mechanism beneath the tubing and causing its actuation and thereafter its retraction.

ALFRED HOFMANN.
VICTOR ANDERSON.